W. WELSH.
FIRE APPARATUS.
APPLICATION FILED FEB. 1, 1916.
1,233,941.
Patented July 17, 1917.
2 SHEETS—SHEET 2.
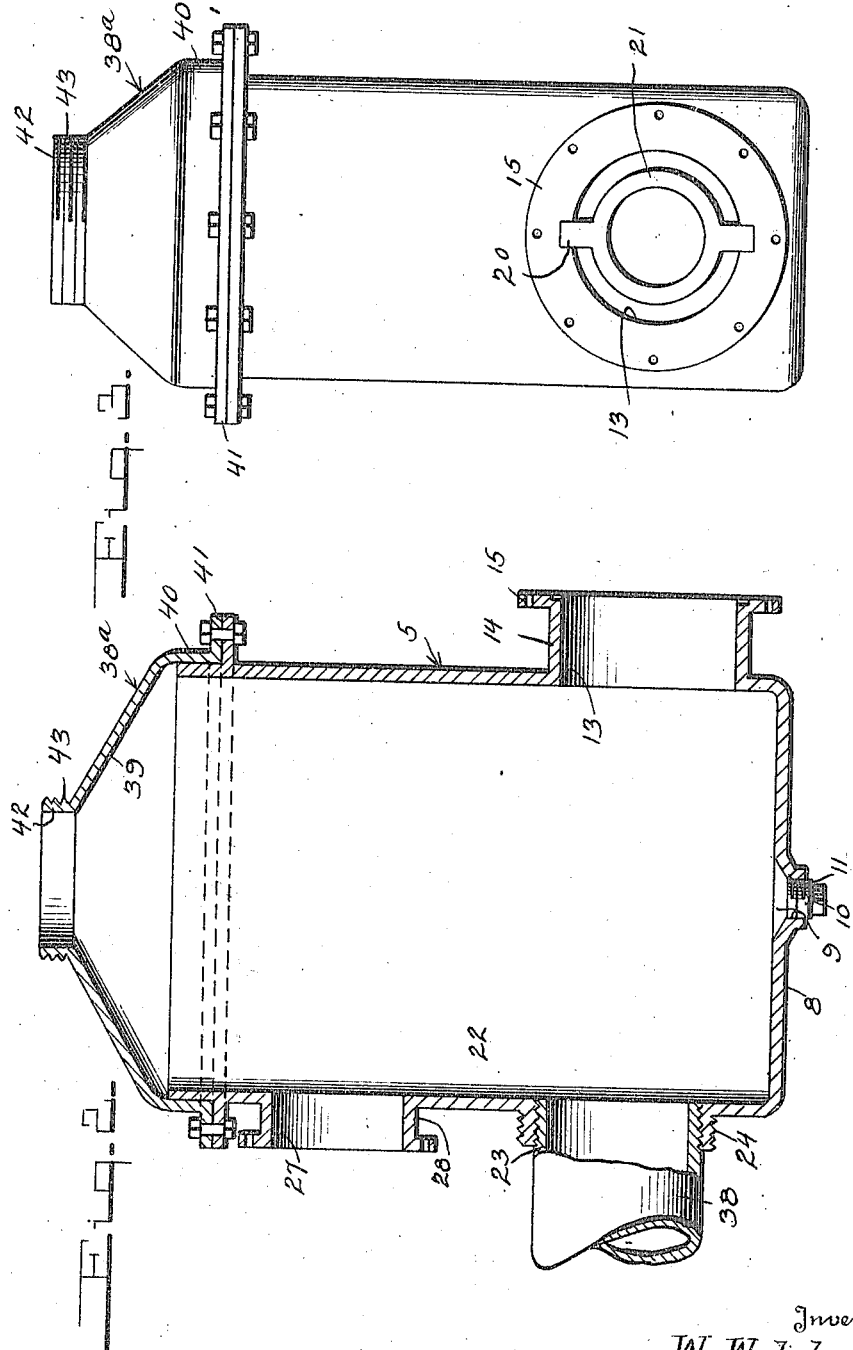

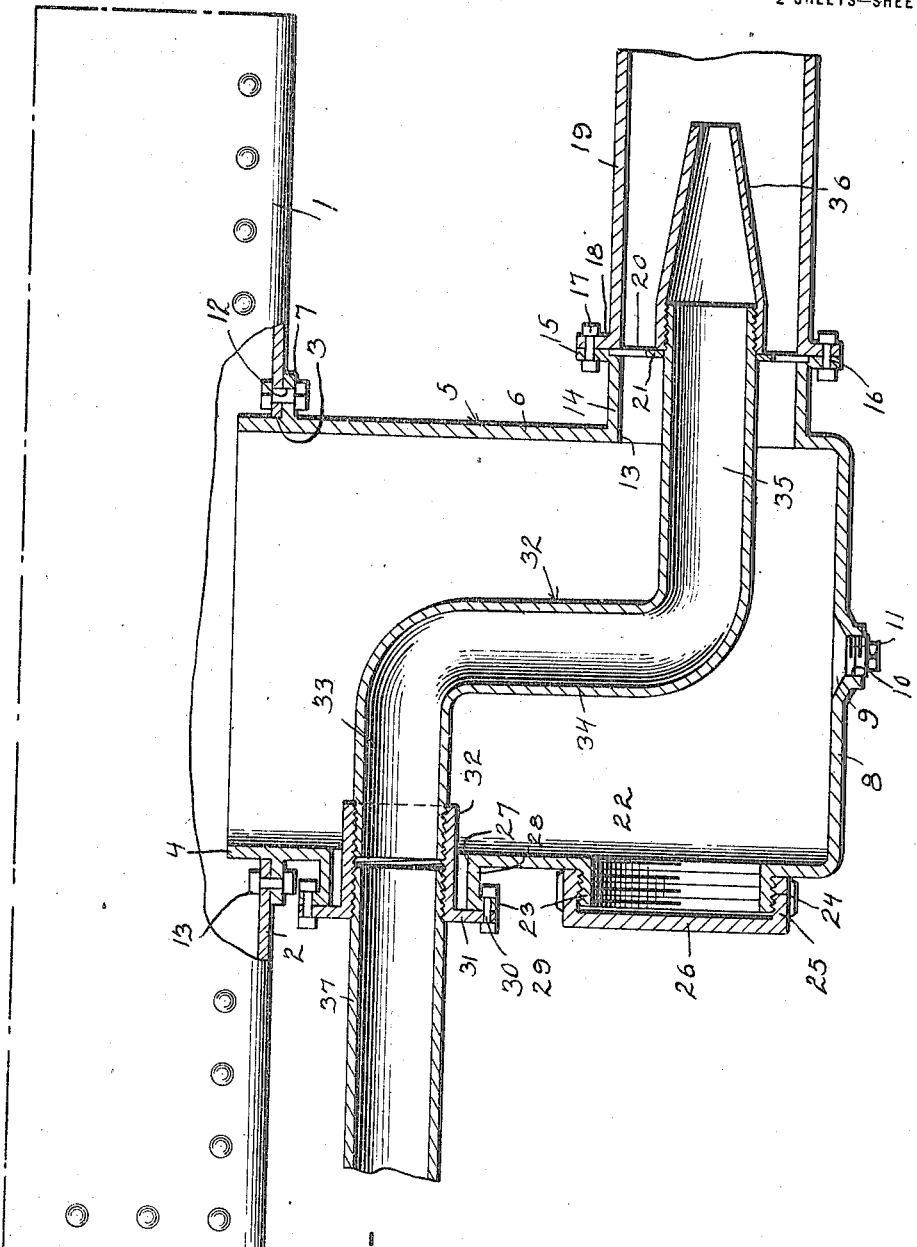

UNITED STATES PATENT OFFICE.

WILLIAM WELSH, OF PUEBLO, COLORADO.

FIRE APPARATUS.

1,233,941.  Specification of Letters Patent.  Patented July 17, 1917.

Application filed February 1, 1916. Serial No. 75,550.

*To all whom it may concern:*

Be it known that I, WILLIAM WELSH, a citizen of the United States, residing at Pueblo, in the county of Pueblo and State of Colorado, have invented certain new and useful Improvements in Fire Apparatus; and I do hereby declare the following to be a full, clear, and exact description of the invention, such as will enable others skilled in the art to which it appertains to make and use the same.

This invention relates to new and useful improvements in fire apparatus and has for its principal object to provide a device attachable to water tanks and the like wherein the water may be forced through a pipe or hose at a materially increased pressure than the pressure of the tank.

Another object of the invention is to provide a device which is capable of being attached to locomotives, or which may be used as a stationary apparatus.

A further object of the invention is to provide a device having two feed openings so that the same may be placed at various positions.

With these and other objects in view, the invention consists in the novel combination and arrangement of parts which will be fully set forth in the following specification and accompanying drawings, in which:—

Figure 1 is a sectional view of the device as it would appear connected to a locomotive tank.

Fig. 2 is a view similar to Fig. 1, showing the device arranged for stationary use and showing the several parts removed, and Fig. 3 is an end elevation of the apparatus.

Referring now to the drawings by characters of reference the numeral 1 designates the tank of a railroad locomotive having the bottom wall 2 formed with an opening 3 of a diameter sufficient to receive the upper end 4 of the apparatus designated by the numeral 5. The apparatus above referred to comprises the hollow cylinder 6 which is formed with a flange 7 near its upper end and which is provided at its lower end with a suitable closure 8, having formed therein a central depressed portion 9 which is provided with a centrally internally screw threaded opening 10 for the reception of the clean-out plug 11. The flange 7 is formed with suitable openings 12 for the reception of bolts 13 by which the device is readily attachable to the tank.

Formed near the closure 8 in the cylindrical body 6 is a suitable opening 13 which is surrounded by the outstanding collar 14, the outer end of which terminates in a flange 15. This flange 15 is formed with a plurality of openings 16 for the reception of the bolts 17 which extend through the flange 18 carried by the pipe 19 and provide a connection by means of which the pipe is detachably secured to the collar 14. The meeting faces of the flanges 15 and 18 are notched to receive the arms 20 of the supporting ring 21 which forms a spider for the support of the steam pipe which will be more fully hereinafter described. Formed at a diametrically opposite point from the opening 13 is an internally screw threaded opening 22 which is surrounded by a collar 23, which collar is externally screw threaded as at 24 to receive the internally screw threaded flange 25 of the cap 26. Positioned upwardly in longitudinal alinement with the opening 22 is a suitable opening 27 which is surrounded by a collar 28 which terminates at its outer edge in a flange 29 provided with openings for the reception of bolts 30. Bolted to the flange 29 by means of said bolts is a flange 31 formed on the internally screw threaded sleeve 32 which extends through the opening 27 and is spaced from the walls thereof as is clearly illustrated in Fig. 1.

The goose-neck injector pipe 32 comprising the tubular body 33, which is provided with suitable external screw threads to fit the threads of the sleeve 32 is clearly shown and the body 33 is formed with the downturned portion 34 which in turn is bent outwardly as at 35 and provided with external screw threads for the reception of the nozzle 36. The threaded end of the extension 35 is retained within the ring 21 as clearly shown in Fig. 1 and it will thus be seen that the nozzle is centered with relation to the pipe 19 at all times. In order to feed steam to the goose-neck pipe 32, a steam pipe 37 is provided and has formed thereon an externally screw threaded end which is threaded into the sleeve 32 and is arranged in such alinement that when screwed thereinto far enough it will abut the end of the body 33 hereinbefore mentioned.

When the device is in use in connection with stationary fire apparatus, instead of providing a cap 26, the same is removed and the pipe 38 threaded into the internally screw threaded collar 23. Instead of securing the flange 7 to the bottom 2 of the tank, there is provided the cap designated generally by the numeral 38ª which comprises the frusto-conical body 39 having formed thereon the flange 40, the lower end of which terminates in the flange 41, which is provided with suitable openings for the reception of suitable bolts by which said cap is secured in place. The upper end of the body 39 terminates in the collar 42 which is provided with external screw threads 43 upon which a cap may be secured. The remaining portion of the apparatus is essentially the same as previously described and the water supply is obtained through the pipe 38 instead of from the tank 1 as previously set forth.

It will be apparent from the foregoing that in use the hose is attached to the pipe 19 and carried to the desired point in the building or other place where a fire occurs and upon turning steam through the pipe 37, it will be evident that it will pass through the goose-neck pipe 32 to the nozzle 36 and thus enter the pipe 19. This action will cause the water surrounding the pipe 32 and nozzle 36 to be forced through the pipe 19 at a high rate of speed and under great pressure until it reaches the hose nozzle from whence it may be directed to the point desired.

While in the foregoing there has been shown and described the preferred embodiment of this invention, it is to be understood that such changes may be made in the combination and arrangement of parts as will fall within the spirit and scope of the appended claim.

What is claimed is:—

A fire apparatus of the character described including a chamber, one end of said chamber being open, a closure at the opposite end of the chamber, a flange positioned near the open end of the chamber, said chamber being formed with a pair of diametrically opposite openings, one of said openings being the outlet opening, the chamber having a third opening in its side wall in vertical alinement with the opening opposite the outlet opening, collars surrounding each of these openings, the collar on the outlet opening being formed with a flange and being recessed to support a spider, a pipe secured to the flange, a cap threaded on the collar surrounding the opening opposite the outlet opening, a flange on the collar surrounding the opening above the opening opposite the outlet opening, a sleeve, a flange on the sleeve secured to the last mentioned flange, a goose-neck pipe threaded into the sleeve and extending into the chamber and terminating in the outlet pipe, said goose-neck pipe being held in place by the sleeve and the spider, a fluid pressure pipe threaded into the sleeve and communicating with the goose-neck pipe and nozzle at the end of the goose-neck pipe.

In testimony whereof I affix my signature in presence of two witnesses.

WILLIAM WELSH.

Witnesses:
H. O. VORIES,
E. A. SMITH.